(12) United States Patent
Spears (10) Patent No.: US 6,566,647 B1
(45) Date of Patent: May 20, 2003

(54) EXPOSURE TIMING ALIGNMENT FOR COLOR SPECIFIC EXPOSURE TIMES

(75) Inventor: Kurt E. Spears, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/158,678

(22) Filed: May 30, 2002

(51) Int. Cl.⁷ ................................................ G01J 3/50
(52) U.S. Cl. .................... 250/226; 250/235; 396/167
(58) Field of Search .............................. 250/226, 235, 250/208.1, 234; 358/513, 514, 515, 518; 396/166, 167; 347/232, 233, 230

(56) References Cited

U.S. PATENT DOCUMENTS 5,724,160 A * 3/1998 Brandestini et al. ........ 358/475
5,936,708 A * 8/1999 Saita ............................ 355/20
6,037,584 A * 3/2000 Johnson et al. ............. 250/235

* cited by examiner

Primary Examiner—Kevin Pyo
Assistant Examiner—Seung C. Sohn (57) ABSTRACT

An optical scanning system. In representative embodiments, an optical scanning system is disclosed which comprises at least one first photosensitive detector that is sensitive to light in a first frequency band, an exposure control circuit that is capable of exposing the first photosensitive detector for a first time period and at least one second photosensitive detector that is sensitive to light in a second frequency band. The second photosensitive detector is fixed at a first location relative to the first photosensitive detector. The exposure control circuit is capable of exposing the second photosensitive detector for a second time period with the second time period being longer than the first time period and the midpoint of the first time period occurring at a time proximate to the time of the midpoint of the second time period.

12 Claims, 9 Drawing Sheets

EXPOSURE TIMING ALIGNMENT FOR COLOR SPECIFIC EXPOSURE TIMES

FIELD OF THE INVENTION

The present invention relates generally to optical detection and, more particularly, to optical scanners used in the creation of color images.

BACKGROUND OF THE INVENTION

Traditionally stepper motors that move in discreet steps have been used with linear image sensors in optical scanners such as are used, for example, in flatbed scanners, film scanners, and copiers, and certain digital cameras to capture images. Recently DC motors have replaced stepper motors in such devices in order to obtain increased positional accuracy in scanning, to increase scanning speed, and to reduce cost. Images are obtained via either reflected light as in the case of photographs and paper documents or transmitted light as in the case of transparencies, film negatives, and photographic slides.

One of the most popular image sensor technologies is that of charge-coupled devices (CCDs). Depending upon the application, accurate color reproduction by image sensors may pose special problems, as the intensity of the optical signal detected by color image sensors is dependent upon wavelength. Both the output intensity of light sources and the detection efficiency of detectors typically used in such systems are wavelength dependent. In addition, the transmission characteristics of transparent media is in general strongly wavelength dependent.

Images containing color are usually created by separating and detecting the image signal in three separate color bands which could be, for example, the red, green, and blue color bands. The use of different amplification gains for each of the three color signals detected could be used to compensate for the combined color dependency of the image creation system. However, as transparent media is strongly absorbing, especially in the blue color band, this solution may not produce an acceptable result due to noise in low signal level cases.

An alternative technique is to detect the optical signal in the green color band for longer than in the red color band and even longer in the blue color band. An acceptable result is obtainable for those cases wherein the scanning movement is stopped during the exposure, as for example when stepper motors are used. However, when movement of the image sensor occurs relative to the object during the scan, as for example with the use of DC motors, a rainbow effect is often observed caused by misalignment of the areas detected. In other words, the center of the area from which a blue signal is received is different from that from which a green signal is received and is different from that from which a red signal is received. In which case, an unacceptable image can result.

SUMMARY OF THE INVENTION

In representative embodiments, an optical scanning system is disclosed which comprises at least one first photosensitive detector that is sensitive to light in a first frequency band, an exposure control circuit that is capable of exposing the first photosensitive detector for a first time period and at least one second photosensitive detector that is sensitive to light in a second frequency band. The second photosensitive detector is fixed at a first location relative to the first photosensitive detector. The exposure control circuit is capable of exposing the second photosensitive detector for a second time period with the second time period being longer than the first time period and the midpoint of the first time period occurring at a time proximate to the time of the midpoint of the second time period.

Other aspects and advantages of the present invention will become apparent from the following detailed description, taken in conjunction with the accompanying drawings, illustrating by way of example the principles of the invention.

BRIEF DESCRIPTION OF THE DRAWINGS

The accompanying drawings provide visual representations which will be used to more fully describe the invention and can be used by those skilled in the art to better understand it and its inherent advantages. In these drawings, like reference numerals identify corresponding elements.

DETAILED DESCRIPTION OF THE PREFERRED EMBODIMENTS

In the following detailed description and in the several figures of the drawings, like elements are identified with like reference numerals.

Color images are captured by flatbed scanners, film scanners, copiers, certain digital cameras and other image detection devices by detecting the intensity of the image signal for selected bands of frequencies. When performing transparency scans, it is desirable to have different exposure times for each color channel as the color absorption characteristics of the transparent media can pose signal-to-noise difficulties in accurately detecting and recreating the image. However, different exposure times for each color channel can result in positional color misalignment in continuous motions systems, as for example those that use DC motors to move the object being scanned relative to the image sensing device. The result can be an image displaying a rainbow effect with the center of the three colors for any given pixel being displaced from the others.

Figure 1:
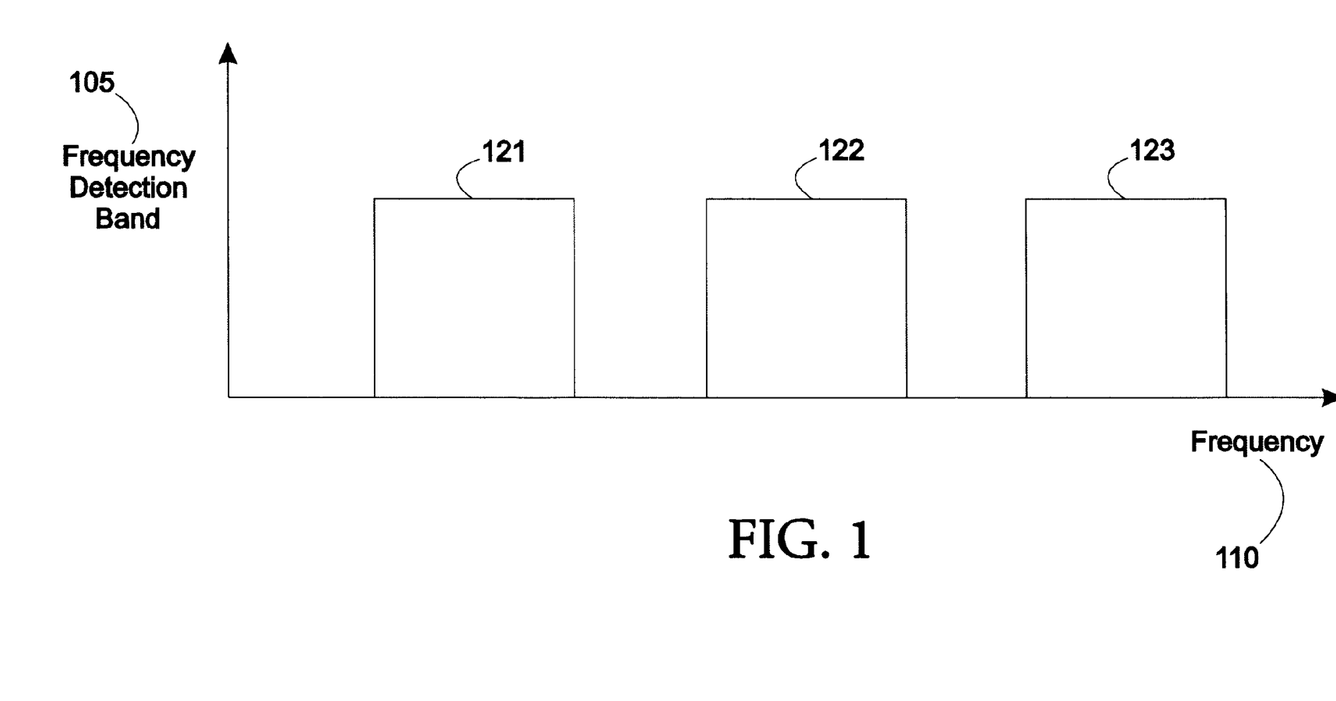
FIG. 1 is a graph of idealized frequency detection band vs. frequency.

FIG. 1 is a graph of idealized frequency detection band 105 vs. frequency 110. In FIG. 1, the intensity of the image is detected in a first frequency band 121 which could be, for example, a red frequency band 121 which is used to detect the red color in the image, a second frequency band 122 which could be, for example, a green frequency band 122 which is used to detect the green color in the image, and a third frequency band 123 which could be, for example, a blue frequency band 123 which is used to detect the blue color in the image. One of ordinary skill in the art will recognize that FIG. 1 is an idealized graph. In practical embodiments the red, green, and blue frequency bands 121,122,123 would not have sharp boundaries as shown in FIG. 1 and would in fact overlap each other to some extent.

Figure 2:
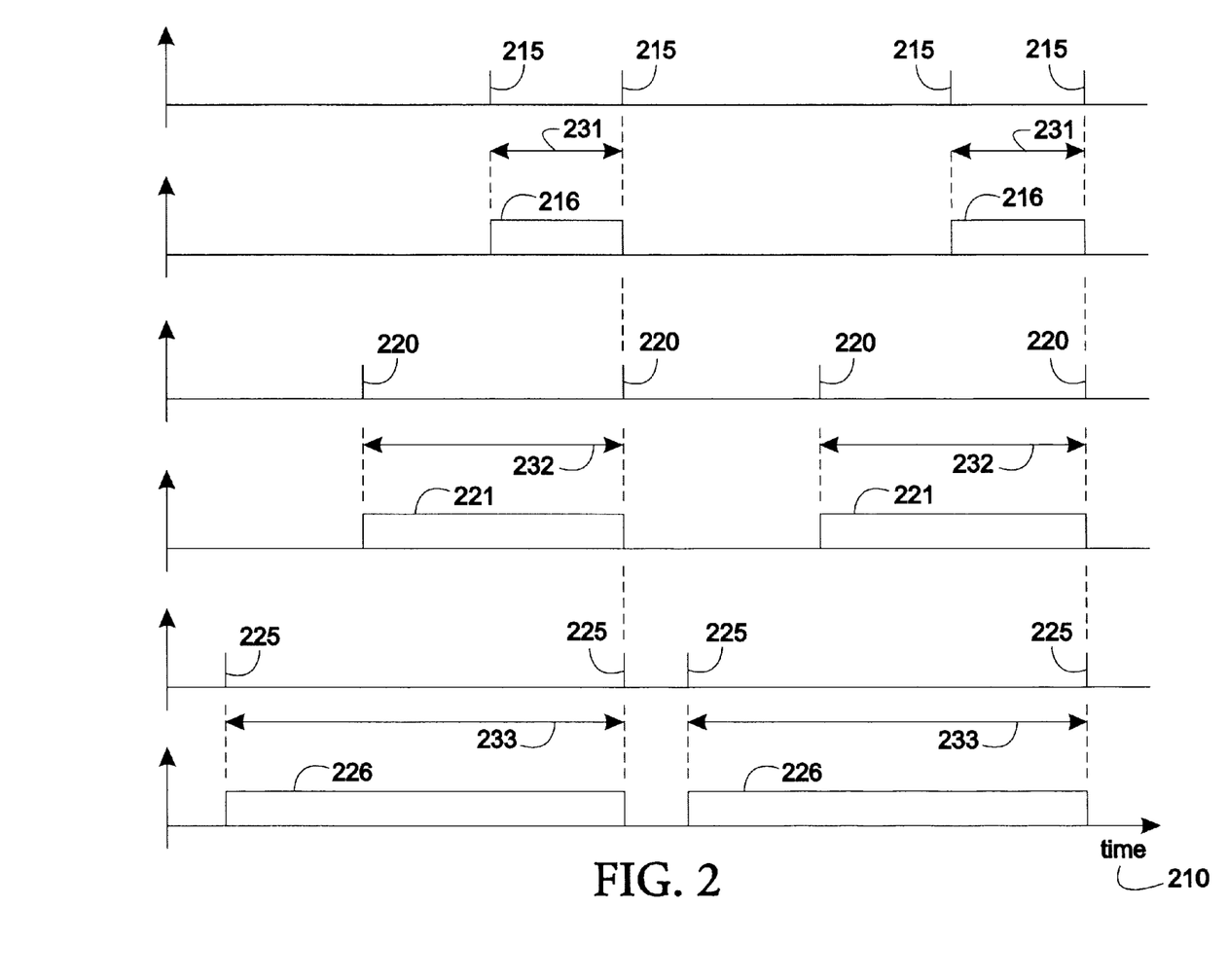
FIG. 2 is a graph of an exposure timing alignment scheme for color-specific exposure times.

FIG. 2 is a graph of an exposure timing alignment scheme for color-specific exposure times. The horizontal axis is time 210. In this example, the graph indicates the timing for variable exposure scanning depending upon the frequency band for which intensity is detected. In a practical example, the ratio of exposure time periods could be red:green:blue of 1:2:4, meaning that if the red channel is exposed for X milliseconds, the green channel is exposed for 2× milliseconds, and the blue channel is exposed for 4× milliseconds which could represent a situation wherein light is transmitted through a transparency or photographic film negative. FIG. 2 is an example of simultaneously-ended exposure of the three color channels. In FIG. 2, first frequency band timing pulses 215, which could be, for example, red frequency band timing pulses 215 start and stop first frequency band image intensity detection 216, which also could be, for example red frequency band image intensity detection 216; second frequency band timing pulses 220 which could be, for example, green frequency band timing pulses 220 start and stop second frequency band image intensity detection 221, which also could be, for example green frequency band image intensity detection 221; and third frequency band timing pulses 225 which could be, for example, blue frequency band timing pulses 225 start and stop third frequency band image intensity detection 226, which also could be, for example blue frequency band image intensity detection 226. Detection in the first frequency band 121 lasts for a first time period 231, in the second frequency band 122 lasts for a second time period 232, and in the third frequency band 123 lasts for a third time period 233.

Figure 3:
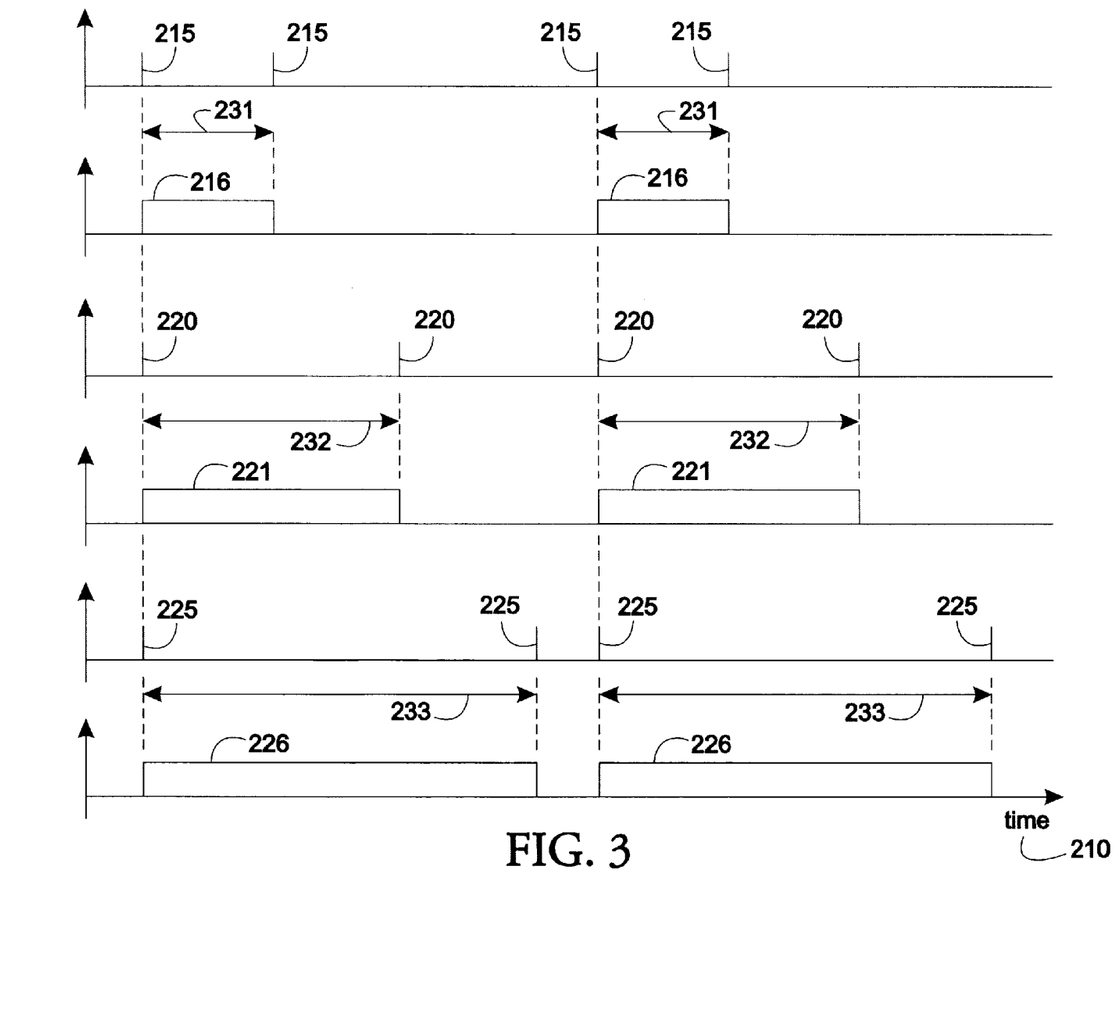
FIG. 3 is another graph of an exposure timing alignment scheme for color-specific exposure times.

FIG. 3 is another graph of an exposure timing alignment scheme for color-specific exposure times. The horizontal axis is time 210. In this example, the graph again indicates the timing for variable exposure scanning depending upon the frequency band for which intensity is detected. And again for this example, the ratio of exposure time periods could be red:green:blue of 1:2:4, representing a situation wherein light is transmitted through a transparency or photographic film negative. FIG. 3 is an example of simultaneously-started exposure of the three color channels. In FIG. 3, first frequency band timing pulses 215, which could be, for example, red frequency band timing pulses 215 start and stop first frequency band image intensity detection 216, which also could be, for example red frequency band image intensity detection 216; second frequency band timing pulses 220 which could be, for example, green frequency band timing pulses 220 start and stop second frequency band image intensity detection 221, which also could be, for example green frequency band image intensity detection 221; and third frequency band timing pulses 225 which could be, for example, blue frequency band timing pulses 225 start and stop third frequency band image intensity detection 226, which also could be, for example blue frequency band image intensity detection 226. In this example, detection in the first frequency band 121 lasts for the first time period 231, in the second frequency band 122 lasts for the second time period 232, and in the third frequency band 123 lasts for the third time period 233.

Figure 4:
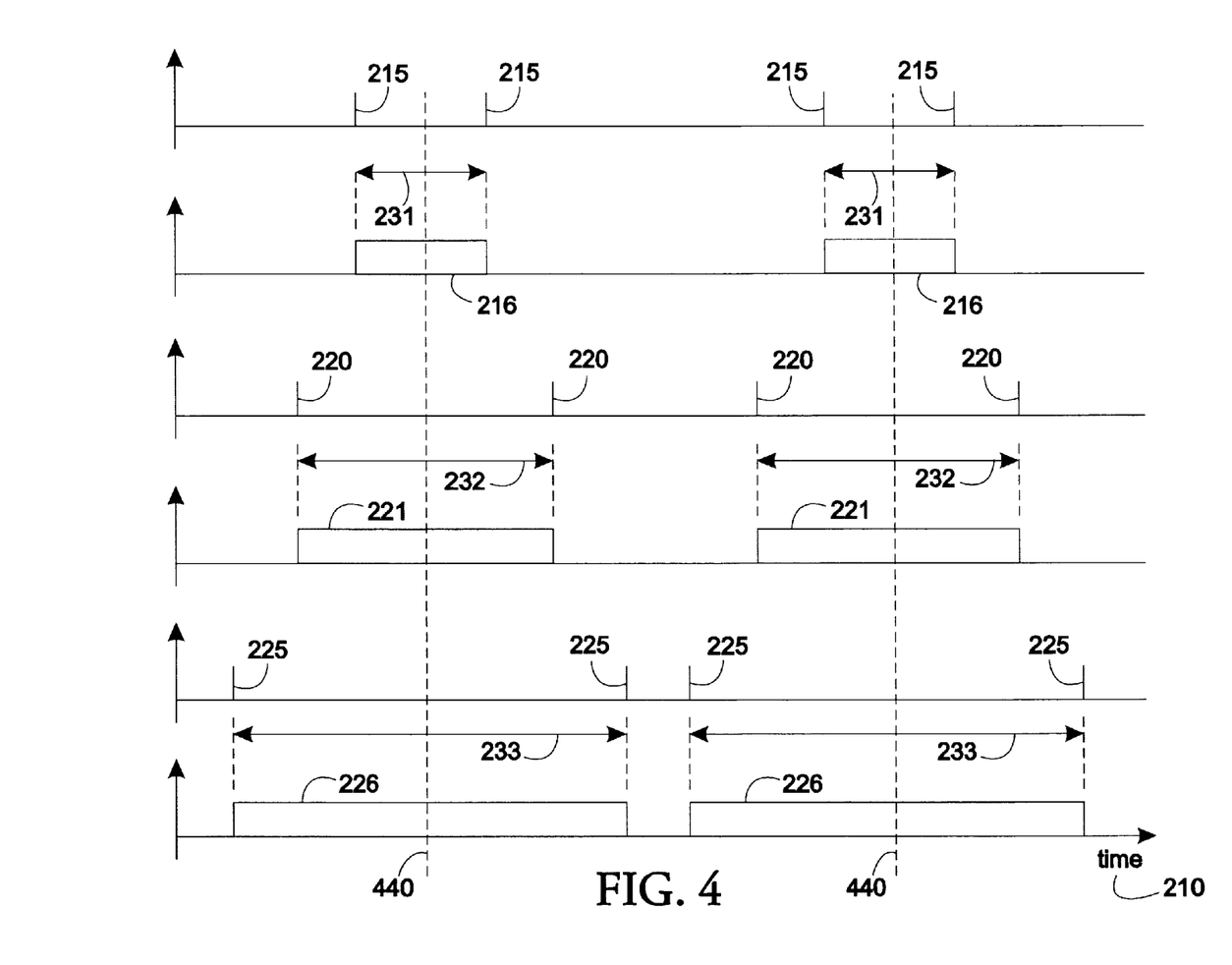
FIG. 4 is a graph of an embodiment of an exposure timing alignment scheme for color-specific exposure times consistent with the teachings of the invention.

FIG. 4 is a graph of an embodiment of an exposure timing alignment scheme for color-specific exposure times consistent with the teachings of the invention. The horizontal axis is time 210. In this example, the graph once again indicates the timing for variable exposure scanning depending upon the frequency band for which intensity is detected. And once again for this example, the ratio of exposure time periods could be red:green:blue of 1:2:4, representing a situation wherein light is transmitted through a transparency or photographic film negative. FIG. 4 is an example of simultaneously mid-point 440 exposure of the three color channels wherein midpoints of first, second, and third time periods 231,232,233 occur at the same time. In FIG. 4, first frequency band timing pulses 215, which could be, for example, red frequency band timing pulses 215 start and stop first frequency band image intensity detection 216, which also could be, for example red frequency band image intensity detection 216; second frequency band timing pulses 220 which could be, for example, green frequency band timing pulses 220 start and stop second frequency band image intensity detection 221, which also could be, for example green frequency band image intensity detection 221; and third frequency band timing pulses 225 which could be, for example, blue frequency band timing pulses 225 start and stop third frequency band image intensity detection 226, which also could be, for example blue frequency band image intensity detection 226. In this embodiment, detection in the first frequency band 121 lasts for the first time period 231, in the second frequency band 122 lasts for the second time period 232, and in the third frequency band 123 lasts for the third time period 233.

Figure 5A:
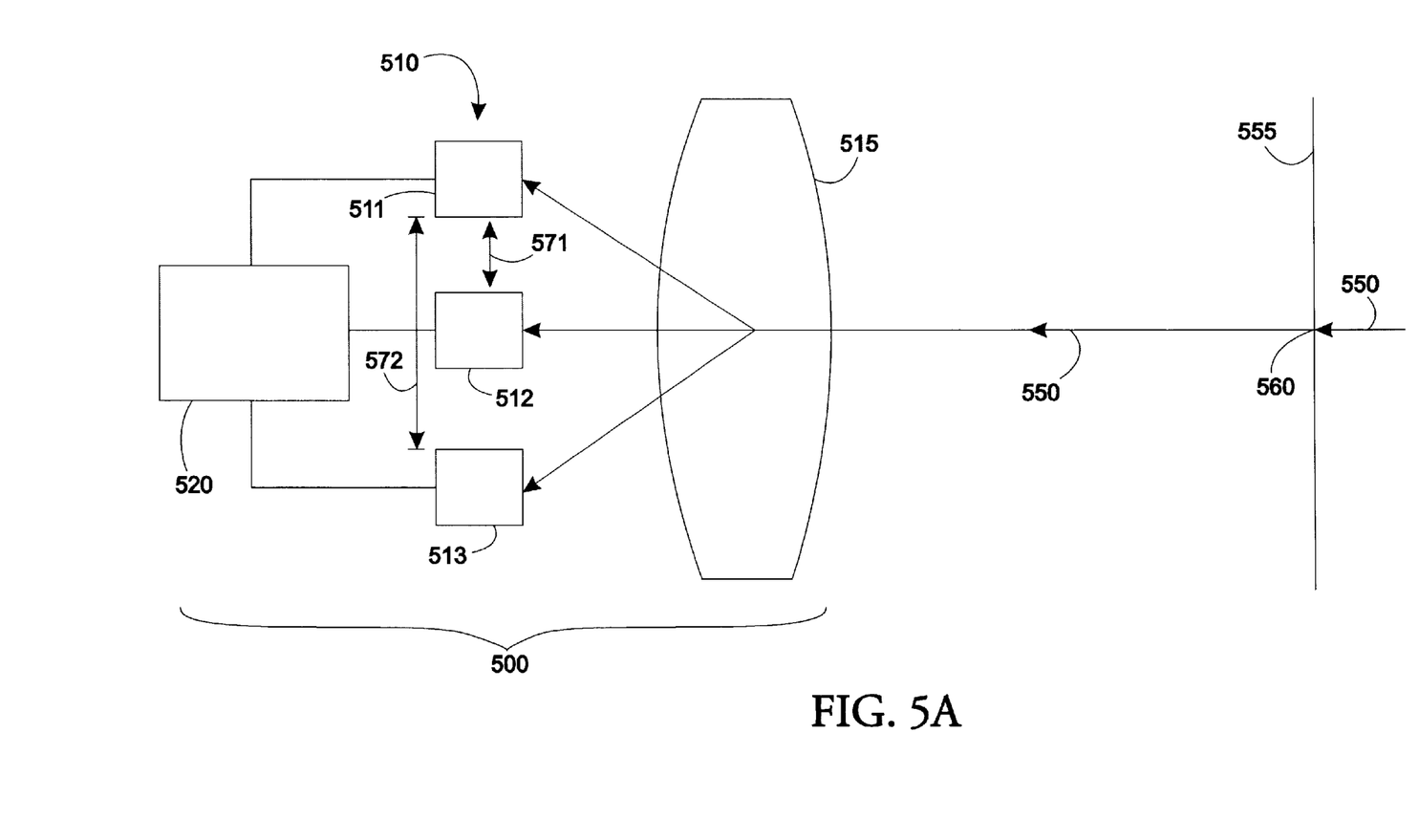
FIG. 5A is a simplified block diagram of an embodiment of an optical scanning system consistent with the teachings of the invention.

FIG. 5A is a simplified block diagram of an embodiment of an optical scanning system 500 consistent with the teachings of the invention. In FIG. 5A, an image sensor 510 comprises a first photosensitive detector 511, a second photosensitive detector 512, and a third photosensitive detector 513, a lens system 515, and an exposure control circuit 520. For ease of illustration, other components of the optical scanning system 500, as for example a drive mechanism, are not shown. The second photosensitive detector 512 is positioned at a first location 571 relative to the first photosensitive detector 511. The third photosensitive detector 513 is positioned at a second location 572 relative to the first photosensitive detector 511. In FIG. 5A, light 550 is transmitted through an object 555 at point 560. While shown as transmitted light 550 the light 550 could also be reflected light 550. The lens system 515 comprises a beam splitter and insures that the center of exposure for the first, second, and third frequency bands 121,122,123 which could be, for example, the red, green, and blue frequency bands 121,122,123 respectively coincides on the object 555 with the point 560. While only one light path has been shown in FIG. 5A, It will be recognized by one of ordinary skill in the art that the lens system focuses light 550 from the point 560 onto each photosensitive detector 511,522,513 from multiple paths. Light 550 from points in the vicinity of the point 560 are focused onto the photosensitive detectors 511,522,513 as the components of the optical scanning system 500 to the left of and including the lens system 515 are moved relative to the object 555. The exposure control circuit 520 utilizes the exposure timing alignment scheme shown in FIG. 4 to obtain color-specific exposure times in order to provide accurate color alignment when using variable exposures and a positional system with continuous motion. Thus, the exposure control circuit 520 controls the timing of initiation and termination of exposure for the photosensitive detectors 511,522,513. The exposure control circuit 520 also provides a mechanism for obtaining exposure information from the photosensitive detectors 511,522, 513 and rearranging this information as needed in order to create a composed image.

Figure 5B:
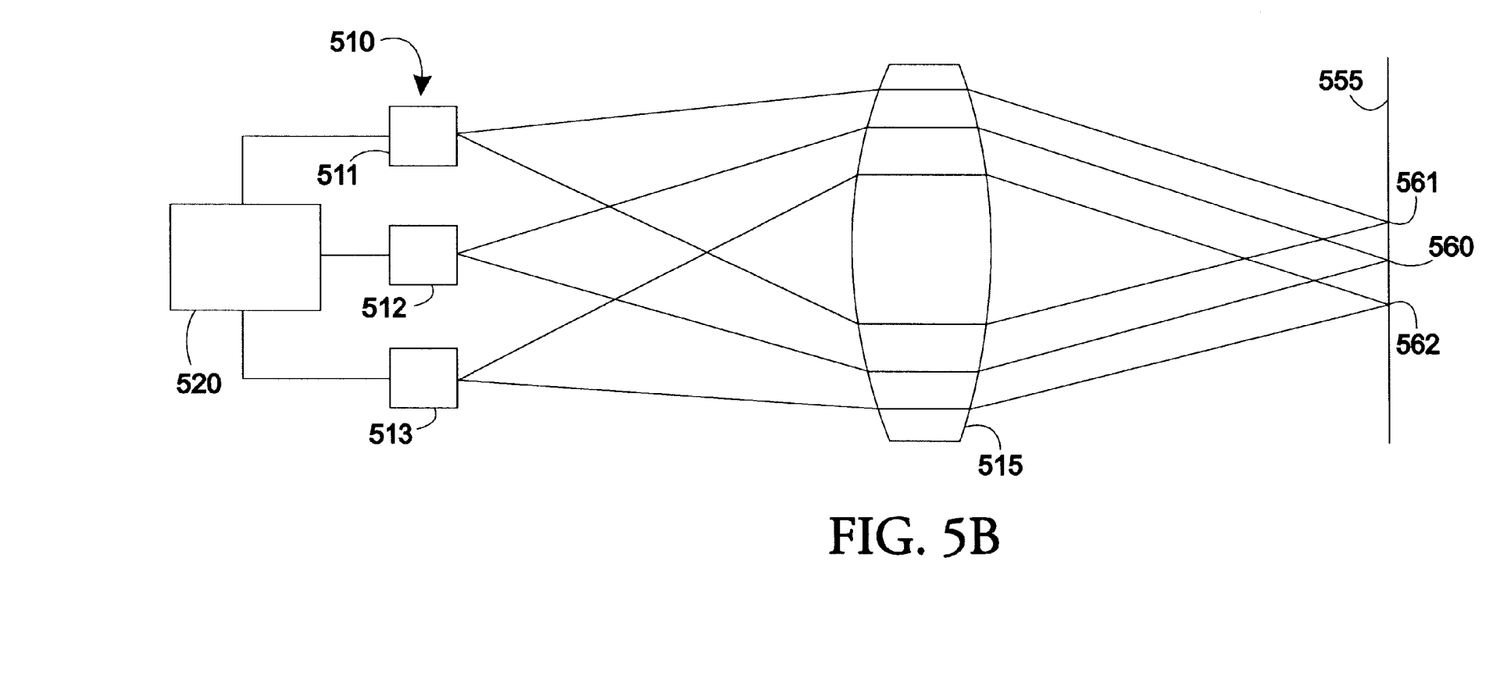
FIG. 5B is another simplified block diagram of the optical scanning system of FIG. 5A.

FIG. 5B is another simplified block diagram of the optical scanning system 500 of FIG. 5A. As opposed to the lens system 515 of FIG. 5A, the lens system 515 of FIG. 5B does not include a beam splitter, and light 550 from first and second adjacent points 561,562 is focused onto first and third photosensitive detectors 511,513 respectively while light 550 from the point 560 continues to be focused onto the second photosensitive detector 512. Because a beam splitter is not used for color separation in FIG. 5B, color filters are used on the photosensitive detectors 511,512,513 to allow each detector to measure light intensity in one of the three frequency bands 121,122,123. For example, the first photosensitive detector 511 utilizes a color filter that allows only light in the first frequency band 121 to reach the detector. Similarly, second and third photosensitive detectors 512,513 utilize color filters that allow only intensity in the second and third frequency bands 122,123 respectively to reach the detector. For clarity of illustration, the various light rays 550 are not labeled in FIG. 5B. The slightly offset color images which are detected by the optical scanning system 500 of FIG. 5B are reconstructed by the electronics of the system 500 to create a color aligned image. Due to the required beam splitter of the lens system 515 of FIG. 5A, the optical scanning system 500 of FIG. 5B is generally less expensive than that of FIG. 5A even with the additional electronics required for image reconstruction of FIG. 5B.

The optical scanning system 500 shown in FIGS. 5A and 5B could be, for example, but not limited to one of the following: optical scanner 500, facsimile machine 500 and digital camera 500.

Figure 6:
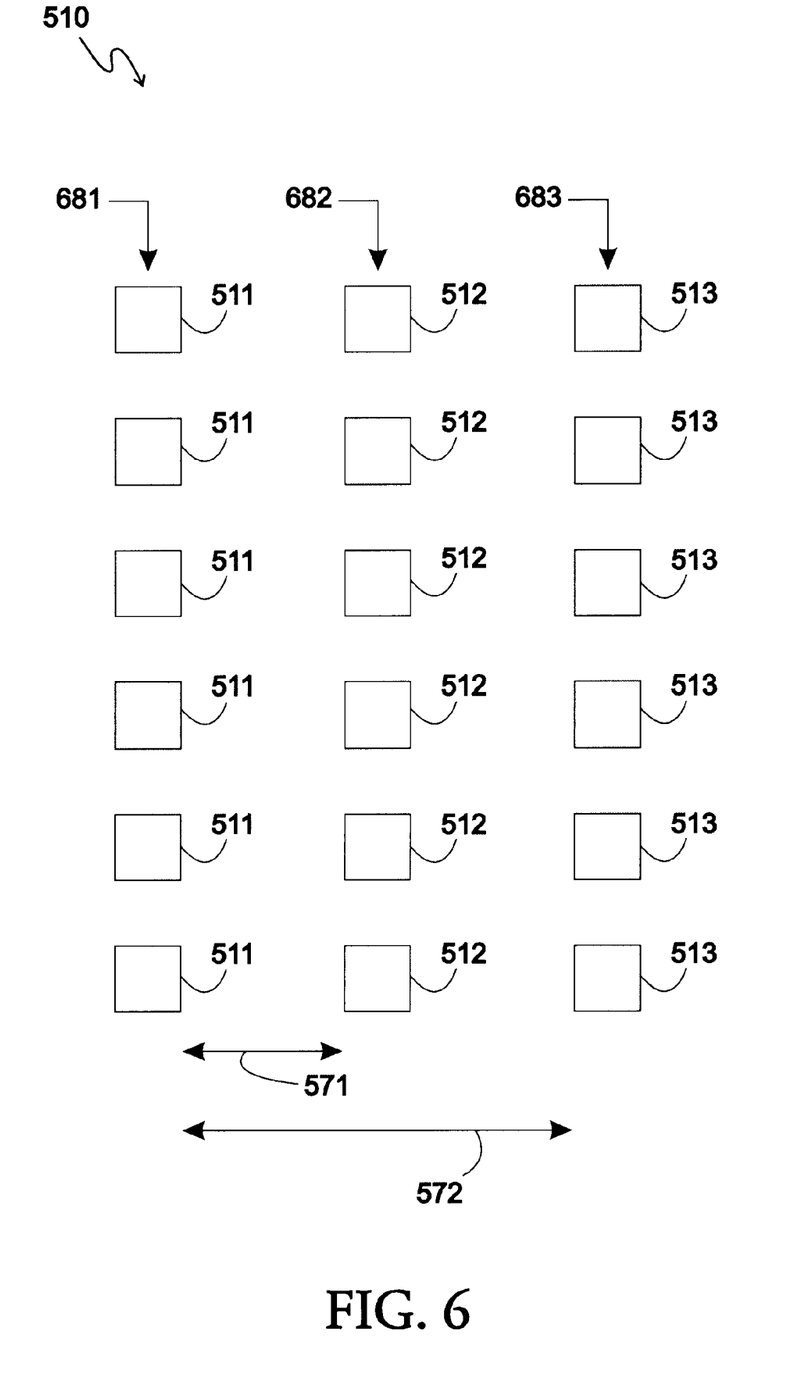
FIG. 6 is a simplified block drawing of an embodiment of an image sensor consistent with the teachings of the invention.

FIG. 6 is a simplified block drawing of an embodiment of an image sensor 510 consistent with the teachings of the invention. The image sensor 510 of FIG. 6 has rows of photosensitive detectors 511,512,513 that detect different colors using, for example, either beam splitters as in FIG. 5A or color filters on the photosensitive detectors as in FIG. 5B or other mechanism now know or later developed. The first photosensitive detectors 511 are located in a first row 681; the second photosensitive detectors 512 are located in a second row 682 fixed at the first location 571 relative to and parallel to the first row 681 of first photosensitive detectors 511; and the third photosensitive detectors 513 are located in a third row 683 fixed at the second location 572 relative to and parallel to the first row 681 of first photosensitive detectors 511. For the configuration of FIG. 6, the exposure control circuit 520 is capable of simultaneous exposure of all first photosensitive detectors 511 for the first time period 231, separate simultaneous exposure of all second photosensitive detectors 512 for the second time period 232, and separate simultaneous exposure of all third photosensitive detectors 513 for the third time period 233.

Figure 7A:
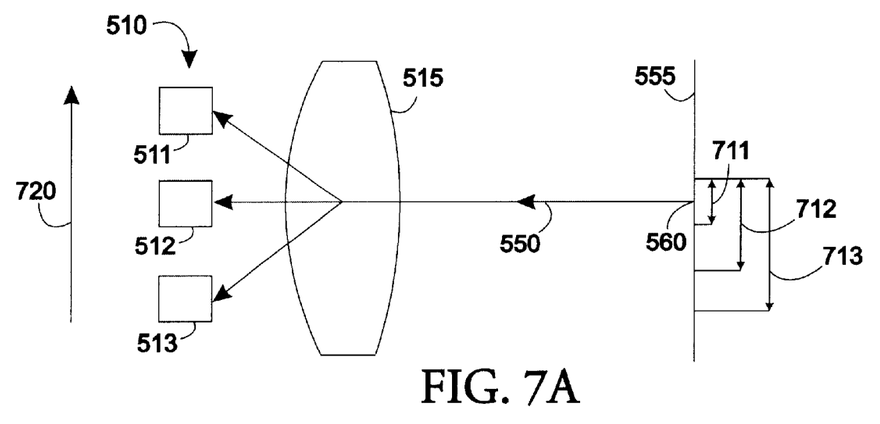
FIG. 7A is a simplified block drawing that includes the image sensor of FIG. 6 from a different viewpoint with other components of the optical system.

FIG. 7A is a simplified block drawing that includes the image sensor 510 of FIG. 6 from a different viewpoint with other components of the optical system 500. The lens system 515 of FIG. 7A comprises the beam splitter as in FIG. 5A. In FIG. 7A, as the components of the optical scanning system 500, including the lens system 515 and image sensor 510, are moved relative to the object 555 in direction 720, light 550 from points in the vicinity of point 560 is incident upon the first, second, and third photosensitive detectors 511,512,513. In discussing FIG. 7A, reference is made to the exposure timing alignment of FIG. 2. As the image sensor 510, the lens system 515, and other appropriate components of the optical scanning system 500 are moved relative to the object 555, during the first time period 231, light 550 from a first exposure area 711 on the object 555 is incident on the first photosensitive detector 511; during the second time period 232, light 550 from a second exposure area 712 on the object 555 is incident on the second photosensitive detector 512; and during the third time period 233, light 550 from a third exposure area 713 on the object 555 is incident on the third photosensitive detector 513. The misalignment of the first, second, and third exposure areas 711,712,713 on the object 555 can result in an unacceptable image.

Figure 7B:
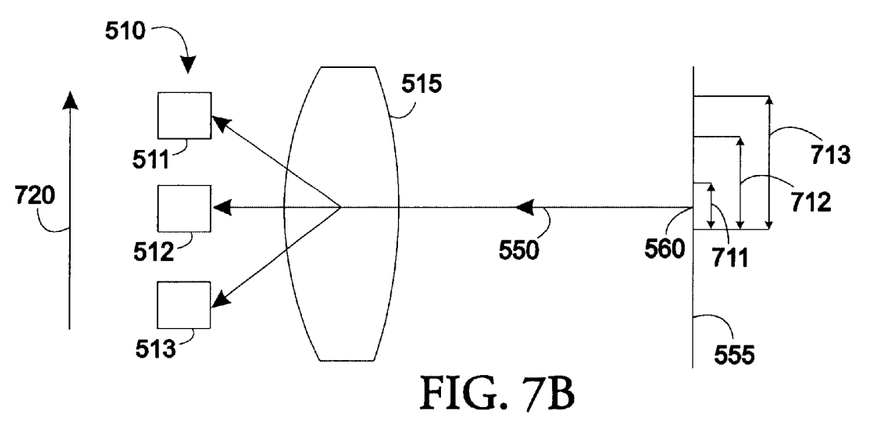
FIG. 7B is another simplified block drawing that includes the image sensor of FIG. 6 from a different viewpoint with other components of the optical system.

FIG. 7B is another simplified block drawing that includes the image sensor 510 of FIG. 6 from a different viewpoint with other components of the optical system 500. The lens system 515 of FIG. 7B comprises the beam splitter as in FIG. 5A. In FIG. 7B, as the components of the optical scanning system 500 including the lens system 515 and image sensor 510 are moved relative to the object 555 in direction 720, light 550 from points in the vicinity of point 560 is incident upon the first, second, and third photosensitive detectors 511,512,513. In discussing FIG. 7B, reference is made to the exposure timing alignment of FIG. 3. As the image sensor 510, the lens system 515, and other appropriate components of the optical scanning system 500 are moved relative to the object 555, during the first time period 231, light 550 from the first exposure area 711 on the object 555 is incident on the first photosensitive detector 511; during the second time period 232, light 550 from the second exposure area 712 on the object 555 is incident on the second photosensitive detector 512; and during the third time period 233, light 550 from the third exposure area 713 on the object 555 is incident on the third photosensitive detector 513. The misalignment of the first, second, and third exposure areas 711,712,713 on the object 555 can result in an unacceptable image.

Figure 7C:
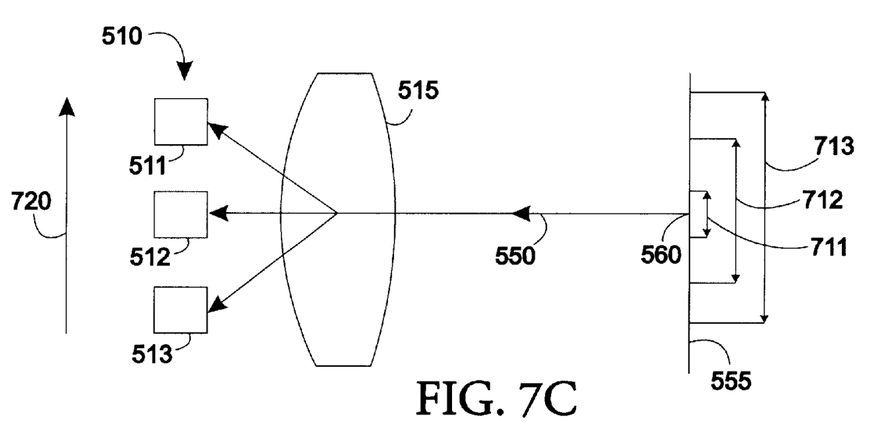
FIG. 7C is yet another simplified block drawing that includes the image sensor of FIG. 6 from a different viewpoint with other components of the optical system.

FIG. 7C is yet another simplified block drawing that includes the image sensor 510 of FIG. 6 from a different viewpoint with other components of the optical system 500. The lens system 515 of FIG. 7C comprises the beam splitter as in FIG. 5A. In FIG. 7C, as the components of the optical scanning system 500 including the lens system 515 and image sensor 510 are moved relative to the object 555 in direction 720, light 550 from points in the vicinity of point 560 is incident upon the first, second, and third photosensitive detectors 511,512,513. In discussing FIG. 7C, reference is made to the exposure timing alignment of FIG. 4. As the image sensor 510, the lens system 515, and other appropriate components of the optical scanning system 500 are moved relative to the object 555, during the first time period 231, light 550 from the first exposure area 711 on the object 555 is incident on the first photosensitive detector 511; during the second time period 232, light 550 from the second exposure area 712 on the object 555 is incident on the second photosensitive detector 512; and during the third time period 233, light 550 from the third exposure area 713 on the object 555 is incident on the third photosensitive detector 513. Note that the first, second, and third exposure areas 711,712,713 on the object 555 are now aligned an a more acceptable image can result.

In alternative embodiments of apparatus similar to that of FIG. 5B, the lens systems 515 of FIGS. 7A–7C do not include the beam splitter. At any given time during exposure, light 550 from adjacent points 561,562 which are not indicated in FIGS. 7A–7C is focused onto first and third photosensitive detectors 511,513 respectively while light 550 from the point 560 continues to be focused onto the second photosensitive detector 512. The slightly offset color images which are detected by the optical scanning system 500 in these embodiments are reconstructed by the electronics of the system 500 to create a color aligned image. Due to the beam splitter of the lens system 515 of FIGS. 7A–7C, the optical scanning system 500 of this alternative embodiment is generally less expensive than that of FIGS. 7A–7C even with the additional electronics for image reconstruction. Again with the exposure timing alignment scheme of FIG. 4, the first, second, and third exposure areas 711,712, 713 on the object 555 are aligned and a more acceptable image can result.

Appropriate timing offset adjustments to the midpoints 440 of the first, second, and third time periods 231,232,233 by the exposure control circuit 520 are made knowing, for example, the speed of relative motion between the object and the image sensor 510 such that at midpoint 440 of the first time period 231, light 550 from the point 560 on the object 555 is incident at proximate center 790, not specifically shown in the drawings, of the first photosensitive detector 511, such that at midpoint 440 of the second time period 232, light 550 from the point 560 on the object 555 is incident at proximate center 790 of the second photosensitive detector 512, and such that at midpoint 440 of the third time period 233, light 550 from the point 560 on the object 555 is incident at proximate center 790 of the third photosensitive detector 513.

Figure 8:
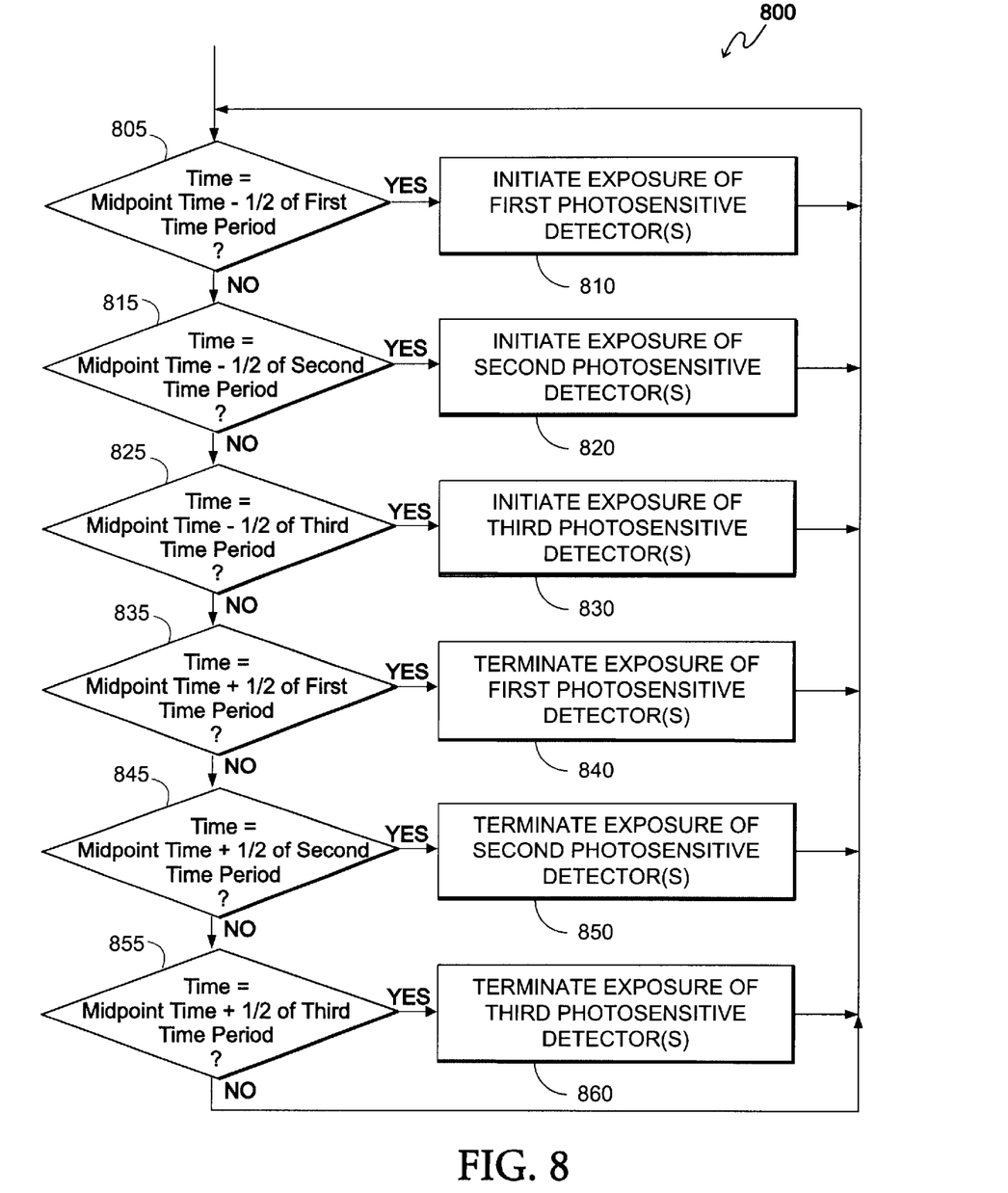
FIG. 8 is a drawing of a flow chart of an embodiment of a method for exposing the photosensitive detectors consistent with the teachings of the invention.

FIG. 8 is a drawing of a flow chart 800 of an embodiment of a method for exposing the photosensitive detectors 511, 512,513 consistent with the teachings of the invention.

In block 805, when time 210 is equal to one-half of the first time period 231 subtracted from the time at which it is intended for the midpoint 440 of the exposure of the first photosensitive detector(s) 511 to occur, block 805 transfers control to block 810. Otherwise, block 805 transfers control to block 815.

In block 810, exposure of the first photosensitive detector (s) 511 is initiated. Block 810 then transfers control back to block 805.

In block 815, when time 210 is equal to one-half of the second time period 232 subtracted from the time at which it is intended for the midpoint 440 of the exposure of the second photosensitive detector(s) 512 to occur, wherein intended midpoints 440 for exposure of first and second photosensitive detector(s) 511,512 occur at proximate times, block 815 transfers control to block 820. Otherwise, block 815 transfers control to block 825.

In block 820, exposure of the second photosensitive detector(s) 512 is initiated. Block 820 then transfers control back to block 805.

In block 825, when time 210 is equal to one-half of the third time period 233 subtracted from the time at which it is intended for the midpoint 440 of the exposure of the third photosensitive detector(s) 513 to occur, wherein intended midpoints 440 for exposure of first and third photosensitive detector(s) 511,513 occur at proximate times, block 825 transfers control to block 830. Otherwise, block 825 transfers control to block 835.

In block 830, exposure of the third photosensitive detector(s) 513 is initiated. Block 830 then transfers control back to block 805.

In block 835, when time 210 is equal to one-half of the first time period 231 added to the time at which it is intended for the midpoint 440 of the exposure of the first photosensitive detector(s) 511 to occur, block 835 transfers control to block 840. Otherwise, block 835 transfers control to block 845.

In block 840, exposure of the first photosensitive detector (s) 511 is terminated Block 840 then transfers control back to block 805.

In block 845, when time 210 is equal to one-half of the second time period 232 added to the time at which it is intended for the midpoint 440 of the exposure of the second photosensitive detector(s) 512 to occur, wherein intended midpoints 440 for exposure of first and second photosensitive detector(s) 511,512 occur at proximate times, block 845 transfers control to block 850. Otherwise, block 845 transfers control to block 855.

In block 850, exposure of the second photosensitive detector(s) 512 is terminated. Block 850 then transfers control back to block 805.

In block 855, when time 210 is equal to one-half of the third time period 233 added to the time at which it is intended for the midpoint 440 of the exposure of the third photosensitive detector(s) 513 to occur, wherein intended midpoints 440 for exposure of first and third photosensitive detector(s) 511,513 occur at proximate times, block 855 transfers control to block 860. Otherwise, block 855 transfers control back to block 805.

In block 860, exposure of the third photosensitive detector (s) 513 is terminated. Block 860 then transfers control back to block 805.

It be understood by one of ordinary skill in that the art that the time referred to herein is time as measured by the optical scanning system 500 and that the blocks of FIG. 8 are repeated as dictated by the optical scanning system 500. The time referred to is typically one that repeats on a periodic basis.

The optical scanning system 500 may be implemented as a combination of hardware and software components. Moreover, the functionality required for implementation may be stored in a program storage medium. The term "program storage medium" is broadly defined herein to include any kind of computer related memory such as, but not limited to, floppy disks, conventional hard disks, DVDs, CD-ROMs, Flash ROMs, nonvolatile ROM, and RAM which would be generally readable by a processing circuit.

A primary advantage of embodiments as described in the present patent document over prior exposure timing alignment systems for color-specific exposure times is the ability to align the exposure periods to the point exposed on the object thus reducing the incidence of color smearing.

What is claimed is:

1. An optical scanning system, comprising:
at least one first photosensitive detector sensitive to light in a first frequency band;
an exposure control circuit capable of exposing the first photosensitive detector for a first time period; and
at least one second photosensitive detector sensitive to light in a second frequency band, wherein the second photosensitive detector is fixed at a first location relative to the first photosensitive detector, wherein the exposure control circuit is capable of exposing the second photosensitive detector for a second time period, wherein the second time period is longer than the first time period, and wherein midpoint of the first time period occurs at time proximate to time of midpoint of the second time period.

2. The optical scanning system as recited in claim 1, wherein the optical scanning system is a machine selected from the group consisting of an optical scanner, a facsimile machine and a digital camera.

3. The optical scanning system as recited in claim 1, further comprising:

at least one third photosensitive detector sensitive to light in a third frequency band and fixed at a second location relative to the first photosensitive detector, wherein the exposure control circuit is capable of exposing the third photosensitive detector for a third time period, wherein the third time period is longer than the second time period, and wherein midpoint of the first time period occurs at time proximate to time of midpoint of the third time period.

4. An optical scanning system, comprising:

at least one first photosensitive detector sensitive to light in a first frequency band;

an exposure control circuit capable of exposing the first photosensitive detector for a first time period; and at least one second photosensitive detector sensitive to light in a second frequency band, wherein the second photosensitive detector is fixed at a first location relative to the first photosensitive detector, wherein the exposure control circuit is capable of exposing the second photosensitive detector for a second time period, wherein the second time period is longer than the first time period, and wherein when first and second photosensitive detectors are moved in a predefined manner relative to an object, at midpoint of the first time period, light from a point on the object is incident at proximate center of the first photosensitive detector and at midpoint of the second time period, light from the point is incident at proximate center of the second photosensitive detector.

5. The optical scanning system as recited in claim 4, wherein the optical scanning system is a machine selected from the group consisting of an optical scanner, a facsimile machine and a digital camera.

6. The optical scanning system as recited in claim 4, further comprising:

at least one third photosensitive detector sensitive to light in a third frequency band and fixed at a second location relative to the first photosensitive detector, wherein the exposure control circuit is capable of exposing the third photosensitive detector for a third time period, wherein the third time period is longer than the second time period, and wherein when first, second, and third photosensitive detectors are moved in a predefined manner relative to the object, at midpoint of the third time period, light from the point is incident at proximate center of the third photosensitive detector.

7. A program storage medium readable by a processing circuit, embodying a software program of instructions executable by the processing circuit to perform exposure alignment, the program comprising:

logic, for a first time period, for exposing at least one first photosensitive detector sensitive to light in a first frequency band; and logic, for a second time period, for exposing at least one second photosensitive detector sensitive to light in a second frequency band, wherein the second photosensitive detector is fixed at a first location relative to the first photosensitive detector, wherein the second time period is longer than the first time period, and wherein midpoint of the first time period occurs at time proximate to midpoint of the second time period.

8. The program storage medium as recited in claim 7, wherein the exposure alignment occurs in a machine selected from the group consisting of an optical scanner, a facsimile machine and a digital camera.

9. The program storage medium as recited in claim 7, the program further comprising:

logic, for a third time period, for exposing at least one third photosensitive detector sensitive to light in a third frequency band and fixed at a second location relative to the first photosensitive detector, wherein the third time period is longer than the second time period and wherein midpoint of the first time period occurs at time proximate to time of midpoint of the third time period.

10. A program storage medium readable by a processing circuit, embodying a software program of instructions executable by the processing circuit to perform exposure alignment, the program comprising:

logic, for a first time period, for exposing at least one first photosensitive detector sensitive to light in a first frequency band;

logic, for a second time period, for exposing at least one second photosensitive detector sensitive to light in a second frequency band, wherein the second photosensitive detector is fixed at a first location relative to the first photosensitive detector, wherein the second time period is longer than the first time period, and wherein when first and second photosensitive detectors are moved in a predefined manner relative to an object, at midpoint of the first time period, light from a point on the object is incident at proximate center of the first photosensitive detector and at midpoint of the second time period, light from the point is incident at proximate center of the second photosensitive detector.

11. The program storage medium as recited in claim 10, wherein the exposure alignment occurs in a machine selected from the group consisting of an optical scanner, a facsimile machine and a digital camera.

12. The program storage medium as recited in claim 10, the program further comprising:

logic, for a third time period, for exposing at least one third photosensitive detector sensitive to light in a third frequency band, wherein the third photosensitive detector is fixed at a second location relative to the first photosensitive detector, wherein the third time period is longer than the second time period, and wherein when first, second, and third photosensitive detectors are moved in a predefined manner relative to the object, at midpoint of the third time period, light from the point is incident at proximate center of the third photosensitive detector.

* * * * *